(12) United States Patent
Brenner

(10) Patent No.: US 11,022,168 B1
(45) Date of Patent: Jun. 1, 2021

(54) SECURING ASSEMBLY HAVING CONTAINER RETAINING HOUSING

(71) Applicant: iSee Store Innovations, L.L.C., St. Louis, MO (US)

(72) Inventor: Steven Allen Brenner, Richmond Heights, MO (US)

(73) Assignee: iSee Store Innovations, L.L.C., St. Louis, MO (US)

( * ) Notice: Subject to any disclaimer, the term of this patent is extended or adjusted under 35 U.S.C. 154(b) by 0 days.

(21) Appl. No.: 16/864,310

(22) Filed: May 1, 2020

(51) Int. Cl.
*F16M 13/02* (2006.01)
*F16B 47/00* (2006.01)

(52) U.S. Cl.
CPC ........... *F16B 47/00* (2013.01); *F16M 13/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,932,625 A * | 10/1933 | Hopple | ................... | A24F 19/10 131/232 |
| 2,657,893 A | 11/1953 | Puckert | | |
| 2,940,713 A | 6/1960 | Van Dusen | | |
| 4,133,575 A | 1/1979 | Mader | | |
| 4,749,104 A * | 6/1988 | Chao | ................... | B65D 81/365 222/181.2 |
| 4,957,254 A * | 9/1990 | Hill | .................... | A47G 23/0225 248/207 |
| 5,022,625 A * | 6/1991 | Klinkhardt | ............... | A47K 5/02 248/309.2 |
| 5,067,680 A * | 11/1991 | Miller | ...................... | A47K 5/12 248/311.3 |
| 5,104,077 A | 4/1992 | Liu | | |
| 5,318,262 A | 6/1994 | Adams | | |
| 5,592,244 A * | 1/1997 | Vyhmeister | ............. | A47F 7/021 248/309.1 |
| 5,816,547 A * | 10/1998 | Croft | ........................ | B42D 3/12 248/205.5 |
| RE36,827 E * | 8/2000 | Belokin | ............... | A47B 73/008 211/75 |
| 6,478,271 B1 | 11/2002 | Mulholland | | |
| 6,502,794 B1 | 1/2003 | Ting | | |
| 6,666,420 B1 | 12/2003 | Carnevali | | |
| 6,669,033 B1 | 12/2003 | Lian | | |
| 6,942,188 B2 | 9/2005 | Tsay | | |
| 6,966,530 B2 | 11/2005 | Hsu | | |
| 7,261,221 B2 * | 8/2007 | Awbrey | ............... | B65D 23/003 222/181.3 |
| 7,458,541 B1 | 12/2008 | Chang | | |
| 7,708,245 B2 | 5/2010 | Woo | | |
| 7,793,899 B2 | 9/2010 | Fan | | |
| 7,850,133 B2 | 12/2010 | Carnevali | | |
| 8,079,557 B2 | 12/2011 | Tu | | |
| 8,333,354 B2 * | 12/2012 | Tooley | ................... | A47K 10/18 248/206.2 |

(Continued)

*Primary Examiner* — Monica E Millner
(74) *Attorney, Agent, or Firm* — The Small Patent Law Group LLC; Joseph M. Butscher

(57) ABSTRACT

A locking member is configured to couple to a suction cup and a suction securing nut. The locking member includes a locking ring, and a container retaining housing coupled to the locking ring. The container retaining housing is configured to retain a container.

20 Claims, 14 Drawing Sheets

(56) References Cited

U.S. PATENT DOCUMENTS

| | | | | |
|---|---|---|---|---|
| 8,894,030 B2* | 11/2014 | Nixon | ............... | A47G 23/0225 |
| | | | | 248/311.2 |
| 9,200,667 B1 | 12/2015 | Hsu | | |
| 9,404,526 B2 | 8/2016 | Huang | | |
| 9,410,571 B2 | 8/2016 | Yang | | |
| 9,664,227 B2* | 5/2017 | Huang | ................ | F16B 47/006 |
| 10,104,986 B2* | 10/2018 | Schaefer | ................ | A47F 7/283 |
| 10,244,873 B2* | 4/2019 | Brenner | ............... | A47F 3/0434 |
| 10,393,168 B2 | 8/2019 | Schaefer | | |
| 10,588,406 B2* | 3/2020 | Schaefer | ............. | A47B 73/008 |
| 2003/0160060 A1* | 8/2003 | Hornblad | ................. | A47F 5/08 |
| | | | | 221/256 |
| 2004/0238701 A1* | 12/2004 | Nanda | ................ | A47K 1/09 |
| | | | | 248/206.4 |
| 2005/0211729 A1* | 9/2005 | Bassett | ................... | A47K 5/12 |
| | | | | 222/181.3 |
| 2007/0114246 A1* | 5/2007 | Awbrey | .............. | B65D 23/003 |
| | | | | 222/181.2 |
| 2008/0061197 A1* | 3/2008 | Carnevali | ........... | F16M 11/2078 |
| | | | | 248/181.1 |
| 2008/0308693 A1 | 12/2008 | Kim | | |
| 2010/0065527 A1* | 3/2010 | Zuberi | ................. | B65D 23/003 |
| | | | | 215/329 |
| 2010/0129144 A1* | 5/2010 | Osborne | ................ | B25H 3/006 |
| | | | | 403/291 |
| 2011/0000925 A1* | 1/2011 | Okamoto | ............... | B60N 3/103 |
| | | | | 220/738 |
| 2014/0374553 A1 | 12/2014 | Park | | |
| 2015/0240862 A1 | 8/2015 | Shi | | |
| 2015/0250333 A1* | 9/2015 | Schaefer | ............ | A47B 73/008 |
| | | | | 211/89.01 |
| 2015/0369276 A1 | 12/2015 | Balmer | | |
| 2016/0201714 A1 | 7/2016 | Zhang | | |
| 2016/0215813 A1 | 7/2016 | Huang | | |
| 2016/0221019 A1* | 8/2016 | Bassett | .................. | B05B 15/30 |
| 2017/0095093 A1* | 4/2017 | Brenner | ............... | A47F 3/0426 |

\* cited by examiner

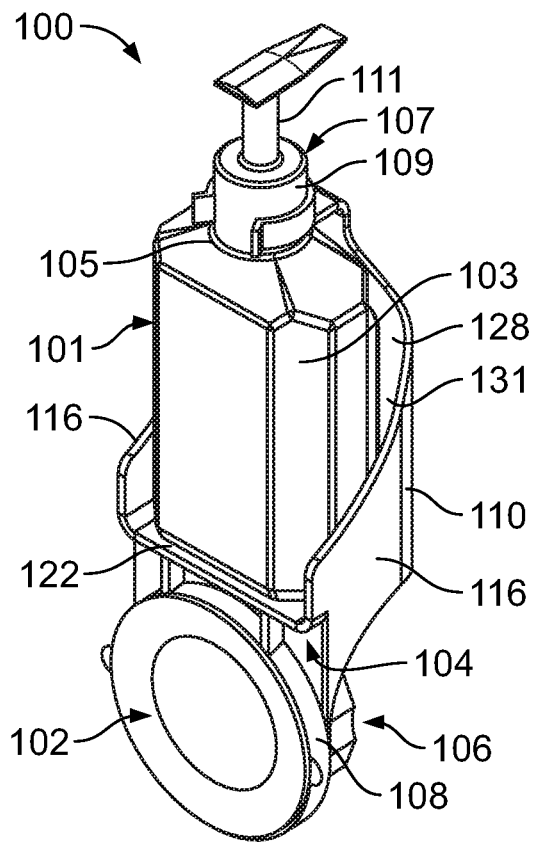
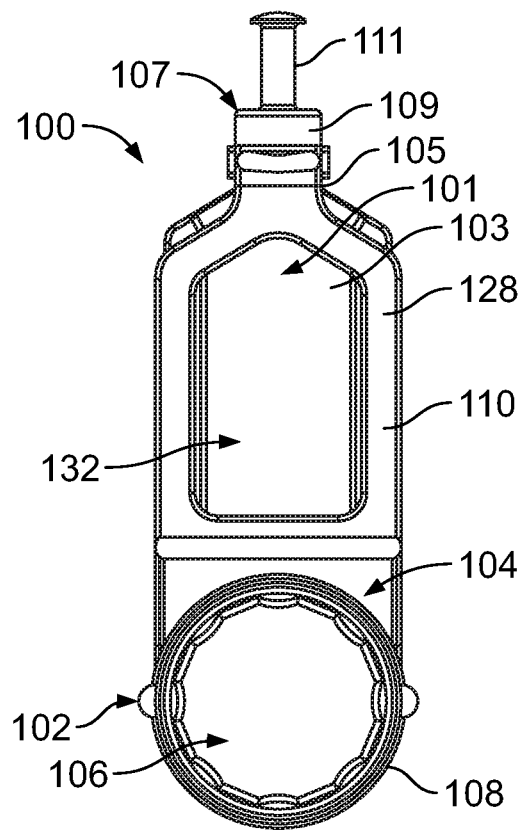
FIG. 1  FIG. 2
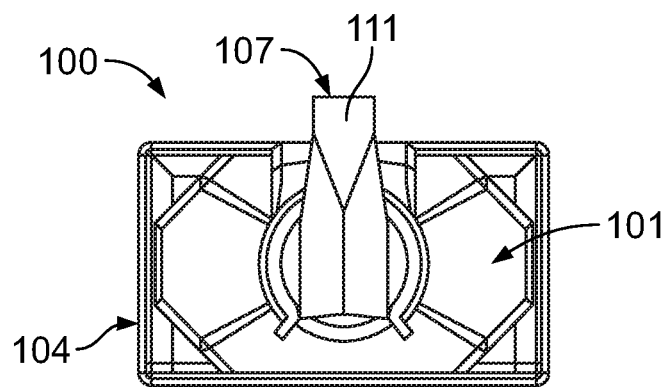
FIG. 3

US 11,022,168 B1

SECURING ASSEMBLY HAVING CONTAINER RETAINING HOUSING

FIELD OF EMBODIMENTS OF THE DISCLOSURE

Embodiments of the present disclosure generally relate to securing assemblies, which may be used to removably secure to a structure, and more particularly to securing assemblies having container retaining housings.

BACKGROUND OF THE DISCLOSURE

Suction cups may be used to adhere to surfaces of structures. For example, a suction cup may removably secure to a glass surface of a door of a refrigerated compartment.

One or more suction cups may be used to secure a component, such as a product display system, to a surface of a structure, such as a glass door of a refrigerated compartment. However, various known suction cups may move or slide relative to the surface of the component, such as if a force of sufficient magnitude is applied to the suction cup. For example, if a product display system retains a sufficient amount of products, the overall weight of the product display system may cause the suction cups to slide down the surface of the structure, or even dislodge therefrom.

Further, suction cups are typically not configured to support certain containers, such as beverage bottles or cans, liquid or foam soap containers, hand sanitizer containers, and/or the like, therefrom.

SUMMARY OF THE DISCLOSURE

A need exists for a robust suction cup that is configured to support various containers therefrom. Further, a need exists for a suction cup that supports a container therefrom, and provides a reliable and strong coupling to a surface of a structure.

With those needs in mind, certain embodiments of the present disclosure provide a locking member configured to couple to a suction cup and a suction securing nut. The locking member includes a locking ring, and a container retaining housing coupled to the locking ring. The container retaining housing is configured to retain a container. In at least one embodiment, the locking ring and the container retaining housing are integrally formed together to provide a single, unitary, monolithic structure.

In at least one example, the container retaining housing upwardly extends from the locking ring. For example, the locking member may include a panel upwardly extending from the locking ring to the container retaining housing. Lateral support walls may upwardly extend from the locking ring on sides of the panel. The lateral support walls may include lower arcuate edges having upwardly bowed contours, and upper arcuate edges having downwardly bowed contours.

In at least one embodiment, the container retaining housing includes a support base, a front wall connected to the support base, and at least portions of lateral support walls connected to the support base and the front wall. The support base may be orthogonal to one or both of the front wall and the at least portion of the lateral support walls.

In at least one embodiment, the front wall includes an outer perimeter frame defining a center opening. The outer perimeter frame may include upright lateral beams, upwardly angled upper beams connected to the upright lateral beams, a neck joint connecting the upwardly angled upper beams, and a neck coupler connected to the neck joint. The neck coupler is configured to securely couple to a neck of the container.

In at least one embodiment, the container retaining housing extends forwardly in relation to the locking ring.

Certain embodiments of the present disclosure provide a securing assembly configured to removably secure to a surface of a structure. The securing assembly includes a suction cup, a suction securing nut coupled to the suction cup, and a locking member coupled to the suction cup and the suction cup, as described herein.

In at least one embodiment, the suction securing nut includes a tactile outer perimeter including a regularly alternating series of protuberances and indentations.

Certain embodiments of the present disclosure provide a method of forming a locking member that is configured to couple to a suction cup and a suction securing nut. The method includes coupling a container retaining housing to a locking ring. The container retaining housing is configured to retain a container.

BRIEF DESCRIPTION OF THE DRAWINGS

FIG. 1 illustrates a perspective rear view of a securing assembly retaining a container, according to an embodiment of the present disclosure.

FIG. 2 illustrates a front view of the securing assembly of FIG. 1 retaining the container.

FIG. 3 illustrates a top view of the securing assembly of FIG. 1 retaining the container.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a securing assembly that includes a suction cup that may be secured to a bracket via a threaded knob that passes through an opening of the main body and is accepted by a nut. The tightening of the nut may act to pull the main body (or a portion thereof) on to the suction cup, and may serve to increase the suction provided by the suction cup. The nut and threaded knob may be coupled via a ratcheting or other torque limiting mechanism to prevent over-tightening.

In at least one embodiment, the securing assembly includes a suction cup, a locking member, and a suction securing nut. The locking member includes a locking ring disposed between the suction cup and the suction securing nut. As the suction securing nut is tightened, the suction securing nut exerts a force into the locking ring, which causes the suction cup to exert an increased securing force into a surface of a component, thereby minimizing, preventing, or otherwise reducing movement of the securing assembly in relation to the surface of the component.

The locking member also includes a container retaining housing coupled to (for example, extending from) the locking ring. In at least one embodiment, the container retaining housing is integrally formed with the locking ring. For example, the locking ring and the container retaining housing may be integrally molded and formed to provide a single, monolithic structure. The container retaining housing is configured to support and retainer a container, such as a beverage bottle or can, a container of liquid or foam soap, a container of hand sanitizer, and/or the like.

Certain embodiments of the present disclosure provide a locking member configured to couple to a suction cup and a suction securing nut. The locking member includes a locking ring, and a container retaining housing extending from the locking ring. The container retaining housing is configured to retain or otherwise support a container.

Figure 4:
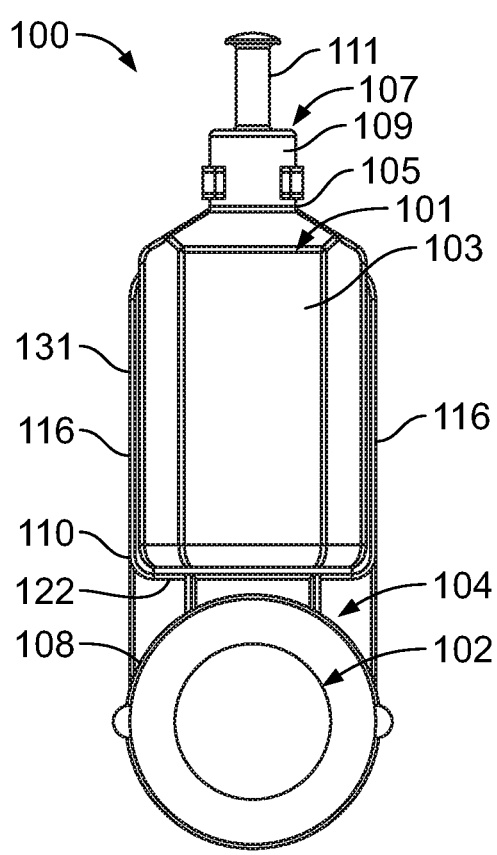
FIG. 4 illustrates a rear view of the securing assembly of FIG. 1 retaining the container.
Figure 5:
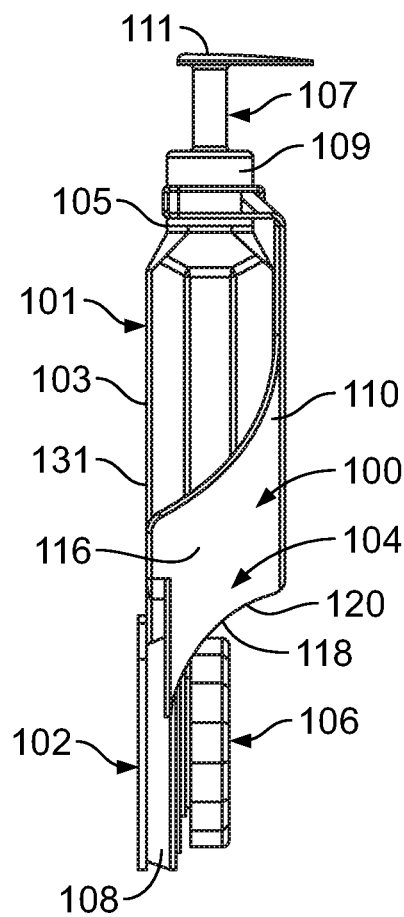
FIG. 5 illustrates a lateral view of the securing assembly of FIG. 1 retaining the container.

FIG. 1 illustrates a perspective rear view of a securing assembly 100 retaining a container 101, according to an embodiment of the present disclosure. FIG. 2 illustrates a front view of the securing assembly 100 of FIG. 1 retaining the container 101. FIG. 3 illustrates a top view of the securing assembly 100 of FIG. 1 retaining the container 101. FIG. 4 illustrates a rear view of the securing assembly 100 of FIG. 1 retaining the container 101. FIG. 5 illustrates a lateral view of the securing assembly 100 of FIG. 1 retaining the container 101. Referring to FIGS. 1-5, the securing assembly 100 includes a suction cup 102 that couples to a locking member 104, which, in turn, couples to a suction securing nut 106.

The locking member 104 includes a locking ring 108 and container retaining housing 110 extending from the locking ring 108. In at least one embodiment, the locking ring 108 is integrally formed with the container retaining housing 110 to provide a single, unitary, monolithic structure. For example, the locking member 104 may be integrally molded and formed as a single piece of plastic. Optionally, the locking member 104 may be formed of other materials, such as metals.

The container 101 may be a bottle, can, or other such retaining vessel. For example, the container 101 may be a beverage bottle or can, a container of liquid or foam soap, a container of hand sanitizer, and/or the like. As shown in FIGS. 1-5, the container 101 includes a main vessel 103, such as a bottle. The main vessel 103 may include a neck 105. A pump assembly 107 may connect to the neck 105 via a cap 109. A hand pump 111 is operatively coupled to the cap 109. As shown in FIGS. 1-5, as an example, the container 101 may be a container of hand sanitizer. Optionally, the main vessel 103 may be sized and shaped differently than shown. For example, the main vessel 103 may not include a pump assembly 107.

Figure 6:
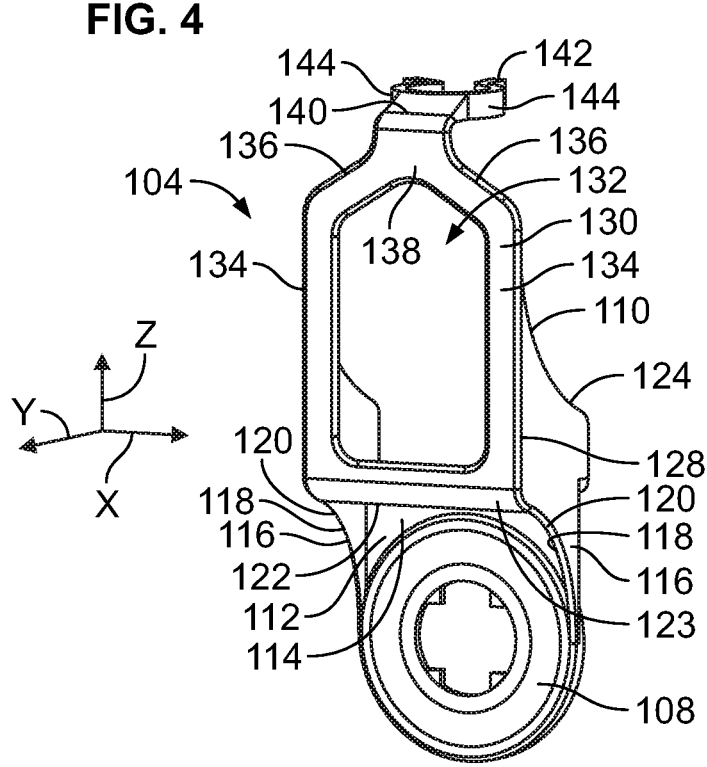
FIG. 6 illustrates a perspective front view of a locking member, according to an embodiment of the present disclosure.
Figure 7:
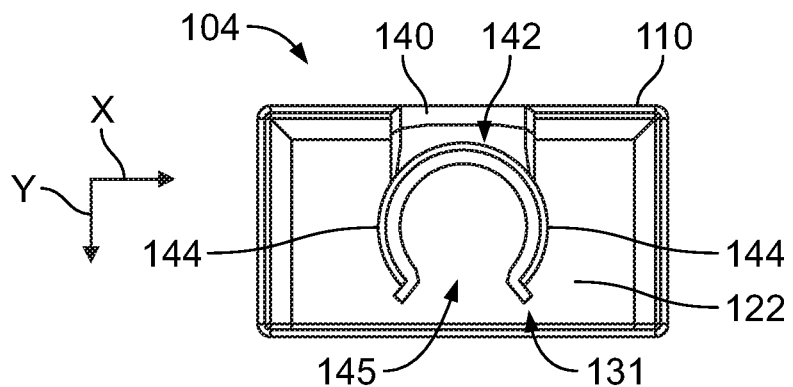
FIG. 7 illustrates a top view of the locking member of FIG. 6.
Figure 8:
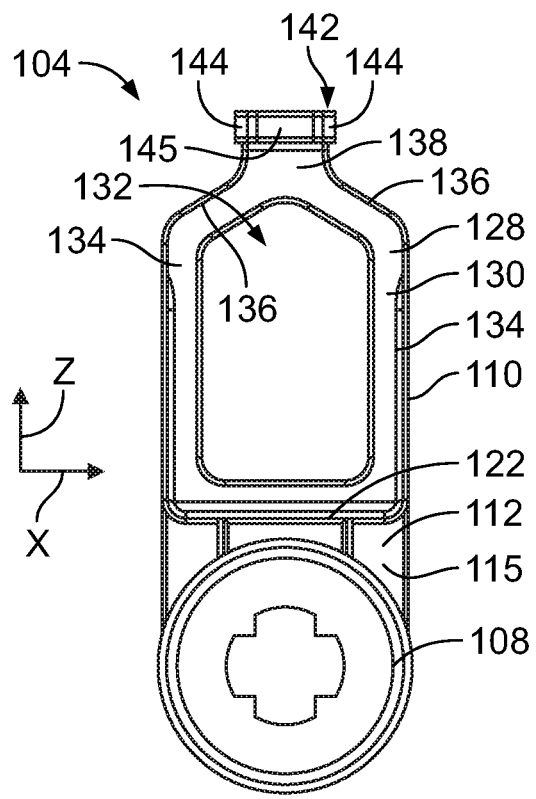
FIG. 8 illustrates a rear view of the locking member of FIG. 6.
Figure 9:
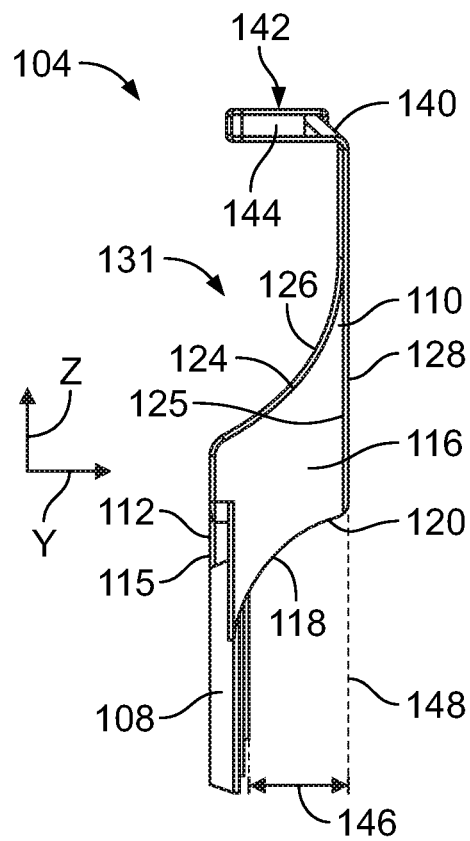
FIG. 9 illustrates a lateral view of the locking member of FIG. 6.

FIG. 6 illustrates a perspective front view of the locking member 104, according to an embodiment of the present disclosure. FIG. 7 illustrates a top view of the locking member 104 of FIG. 6. FIG. 8 illustrates a rear view of the locking member 104 of FIG. 6. FIG. 9 illustrates a lateral view of the locking member 104 of FIG. 6. Referring to FIGS. 6-9, the locking ring 108 is integrally coupled to the container retaining housing 110. In at least one embodiment, the locking ring 108 and the container retaining housing 110 are integrally molded and formed together as a single, unitary, monolithic structure. For example, the locking member 104 may be integrally formed as a single piece of injection molded plastic.

In at least one embodiment, the container retaining housing 110 upwardly extends from the locking ring 108. For example, a panel 112 upwardly extends from the locking ring 108 to the container retaining housing 110. The panel 112 may be a flat, planar piece, having a front surface 114 and a rear surface 115, both of which may be flat or substantially flat. The rear surface 115 is configured to rest against a structure, such as a glass pane, a mirror, or the like.

Lateral support walls 116 upwardly extend from the locking ring 108 on either side of the panel 112. The lateral support walls 116 may be perpendicular to the panel 112. The lateral support walls 116 may include lower arcuate edges 118 having upwardly bowed contours 120.

The lateral support walls 116 and the panel 112 connect to a support base 122, which is configured to support a lower surface of the vessel 103 (shown in FIGS. 1 and 4, in particular). The support base 122 is orthogonal to the panel 112 and the lateral support walls 116. For example, the support base 122 is parallel to an X-Y plane. The support base 122 may be horizontally aligned. The panel 112 is parallel to an X-Z plane that is orthogonal to the X-Y plane. The panel 112 may be vertically aligned. The lateral support walls 116 may be parallel to a Y-Z plane that is orthogonal to the X-Y plane and the X-Z plane. The lateral support walls 116 may be vertically aligned.

In at least one embodiment, the container retaining housing 110 includes the support base 122, at least portions of the lateral support walls 116, and a front wall 128, as described herein. As an example, the container retaining housing 110 includes the support base 122, the front wall 128 connected to the support base 122, and at least portions of the lateral support walls 116 connected to the support base 122 and the front wall 128. Optionally, the container retaining housing 110 may not include the lateral support walls 116. As another example, the container retaining housing 110 may include one or more curved walls connected to the support base 122. The curved walls may be configured to conform to an outer surface of a container. For example, the container retaining housing 110 may include a semi-cylindrical wall connected to the support base 122.

In at least one embodiment, the lateral support walls 116 extend upwardly past the support base 122. The lateral support walls 116 may include upper arcuate edges 124 having downwardly bowed contours 126, which may be opposite in curvature from the upwardly bowed contours 120.

A front wall 128 upwardly extends from a front edge 123 of the support base 122 and outwardly from the front edges 125 of the lateral support walls 116. At least a portion of the front wall 128 extends between the opposed lateral support walls 116. The front wall 128 may be or otherwise include an outer perimeter frame 130 defining a center opening 132. The center opening 132 allows a product label of the container 101 to be seen therethrough. Optionally, the front wall 128 may include a contiguous wall that does not include a center opening 132. For example, the front wall 128 may be formed of a transparent plastic that allows for viewing therethrough. Alternatively, the front wall 128 may be a contiguous opaque wall without a center opening.

In at least one embodiment, the outer perimeter frame 130 includes upright lateral beams 134 that connect to upwardly angled upper beams 136. The upper beams 136 connect at a neck joint 138. The neck joint 138, in turn, connects to an inwardly-directed tab 140, which in turn connects to a neck coupler 142. The neck coupler 142 includes resilient prongs 144 (having a neck opening 145 therebetween) that are configured to flexibly receive and retain a neck of the container 101, such as the cap 109 (shown in FIGS. 1-5). For example, the prongs 144 resiliently deflect around and grasp the cap 109, thereby providing a secure retaining connection therewith.

As shown in FIG. 9, in particular, the container retaining housing 110 extends forwardly in relation to the locking ring 108 a distance 146. The support base 122 and the lateral support walls 116 extend forwardly to a plane 148 that is further forward than the locking ring 108.

Referring to FIGS. 1-9, the container 101 is retained by the container retaining housing 110. In at least one embodiment, a container chamber 131 is defined between an upper surface of the support base 122, interior surfaces of the lateral support walls 116, and an interior surface of the front wall 128. In particular, the main vessel 103 is supported on the support base 122 between the lateral support walls 116 and the front wall 128. A portion of the container 101 is viewable through the center opening 132 of the front wall 128, thereby allowing an individual to see an identification label, mark, or the like of the container 101. The neck 105 of the container 101 is securely retained by the neck coupler 142.

Figure 10:
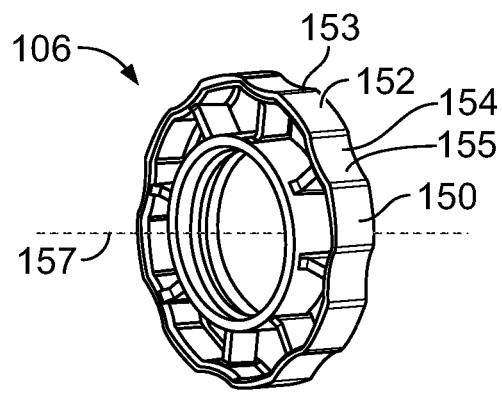
FIG. 10 illustrates a perspective rear view of a suction securing nut, according to an embodiment of the present disclosure.
Figure 11:
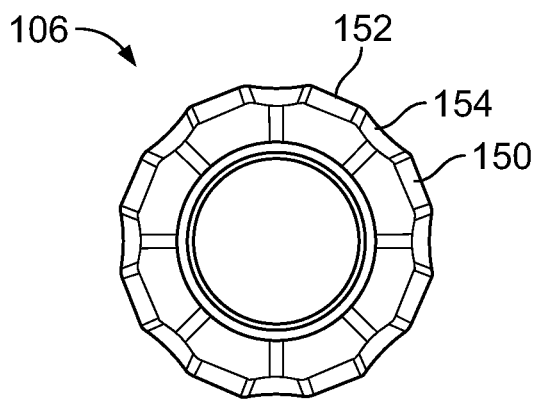
FIG. 11 illustrates a front view of the suction securing nut of FIG. 10.
Figure 12:
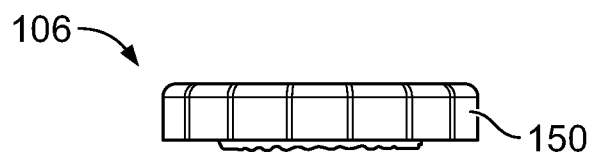
FIG. 12 illustrates a lateral view of the suction securing nut of FIG. 10.

FIG. 10 illustrates a perspective rear view of the suction securing nut 106, according to an embodiment of the present disclosure. FIG. 11 illustrates a front view of the suction securing nut 106 of FIG. 10. FIG. 12 illustrates a lateral view of the suction securing nut 106 of FIG. 10. Referring to FIGS. 10-12, in at least one embodiment, the suction securing nut 106 includes a tactile outer perimeter 150 including a regularly alternating series of protuberances 152 and indentations 154. The protuberances 152 and indentations 154 provide tactile, ergonomic gripping features that allow an individual to easily and readily grasp and rotate the suction securing nut 106. Each of the protuberances 152 and indentations 154 may have a radius of curvature. For example, the protuberances 152 may have a first radius of curvature 153 (such as a curvature that is outwardly bowed away from a central axis 157 of the suction securing nut 106), and the indentations 154 may have a second radius of curvature 155 (such as a curvature that is inwardly bowed toward the central axis 157), which may be opposite the first radius of curvature, thereby providing the rounded peaks and valleys of the protuberances 152 and indentations 154, respectively. Alternatively, the suction securing nut 106 may not include the tactile outer perimeter 150. Instead, the outer perimeter may be smooth without indentations and protuberances.

Figure 13:
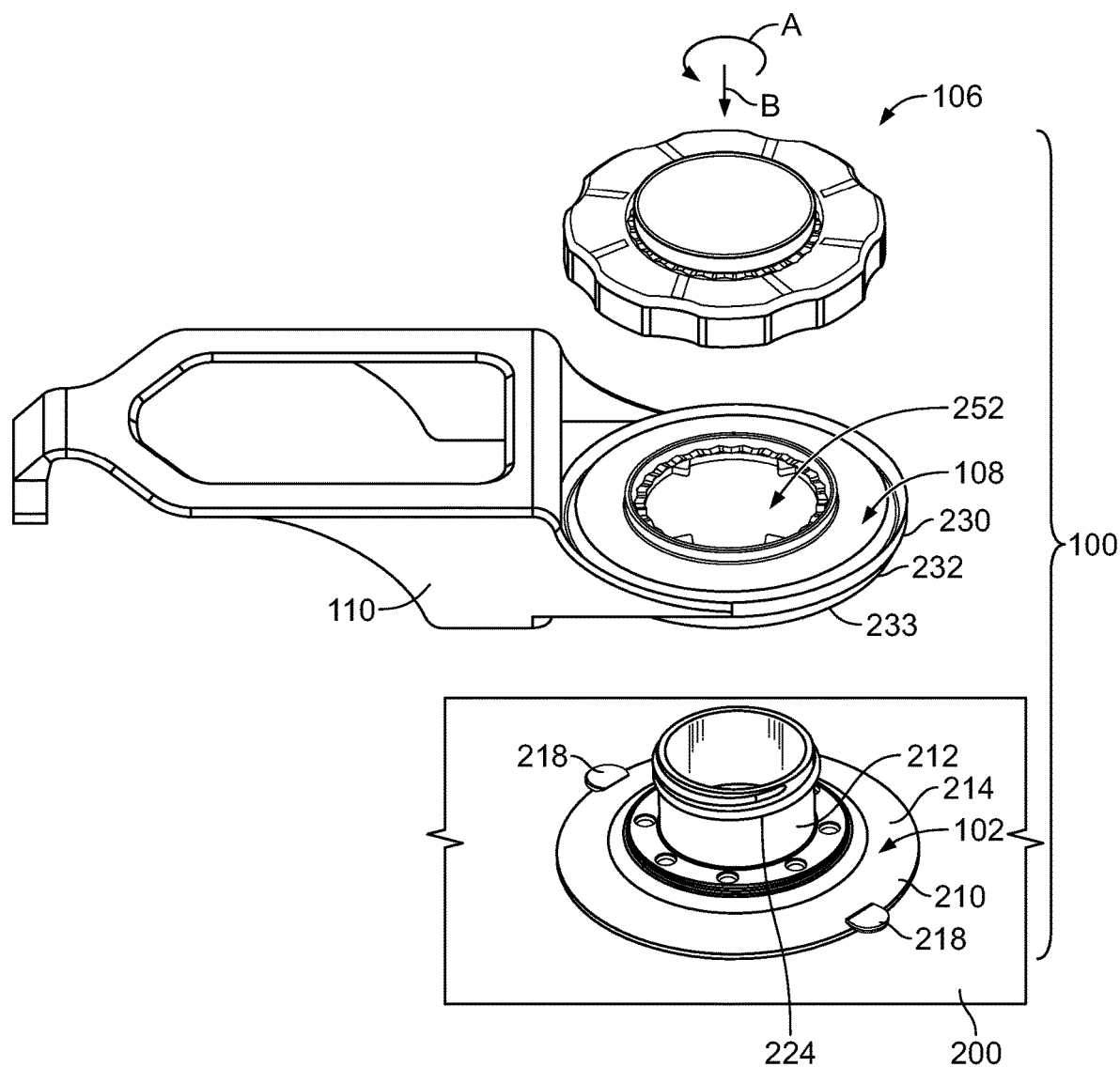
FIG. 13 illustrates a perspective exploded view of a securing assembly, according to an embodiment of the present disclosure.

FIG. 13 illustrates a perspective exploded view of the securing assembly 100, according to an embodiment of the present disclosure. The suction cup 102 is configured to directly couple to a structure 200, such as a panel, wall, beam, or other such structure. The locking ring 108 of the locking member 104 couples to the suction cup 102. The suction securing nut 106 couples to the locking ring 108 and the suction cup 102. Optionally, the locking ring 108 may be a non-ring like structure, such as one or more panels, or the like.

As shown, the locking ring 108 is disposed between the suction cup 102 and the suction securing nut 106. A portion of the locking ring 108 (such as a beveled rim 232) is configured to be urged into a portion of the suction securing nut 106 (such as an annular lip 214 of a suctioning base 210) as the suction securing nut 106 is tightened in relation to the suction cup 102. In at least one embodiment, an intermediate structure, such as a portion of a bracket or the like, may be disposed between the suction securing nut 106 and the locking ring 108, and/or the locking ring 108 and the suction cup 102.

Referring to FIGS. 1-13, in at least one embodiment, when the securing assembly 100 is secured to the structure 200 by the suction cup 102, the container 101 is trapped within the container retaining housing 110 in relation to the surface of the structure 200. For example, the container 101 is unable to be lifted out of the container retaining housing 110, which blocks the container 101 from being pulled forward, and the neck coupler 142 secures around the neck 105 of the container 101, thereby preventing the container 101 from being lifted in an upward direction. In general, the orientation of the container retaining housing 110, including the neck coupler 142, secures the container 101 proximate to (such as against) the structure 200. As such, the container 101 is unable to be removed when secured within the container retaining housing 110 and the suction cup 102 is secured to the structure 200. To remove the container 101, the entire securing assembly 100 is first removed from the structure 200. As such, the securing assembly 100 deters unauthorized removal (for example, theft) of the container 101.

Figure 14:
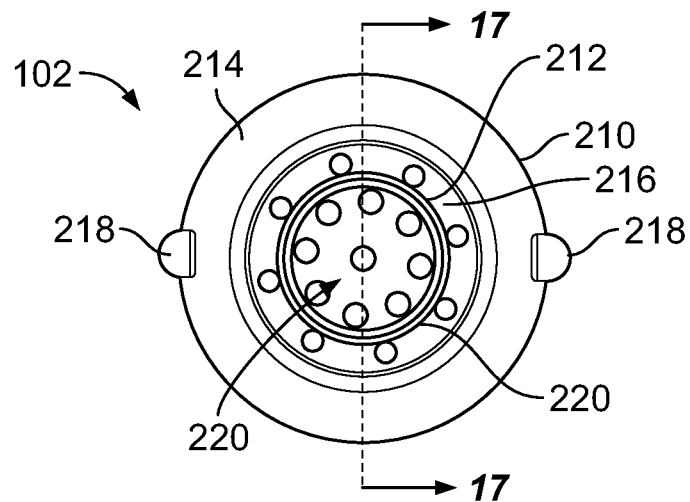
FIG. 14 illustrates a top view of a suction cup, according to an embodiment of the present disclosure.
Figure 15:
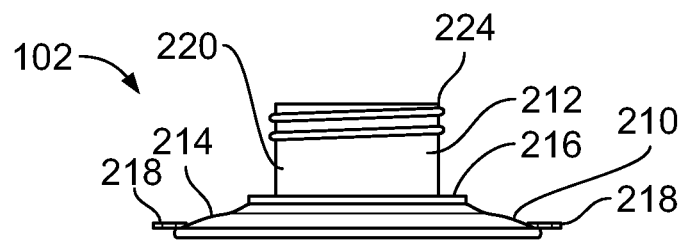
FIG. 15 illustrates a lateral view of the suction cup.
Figure 16:
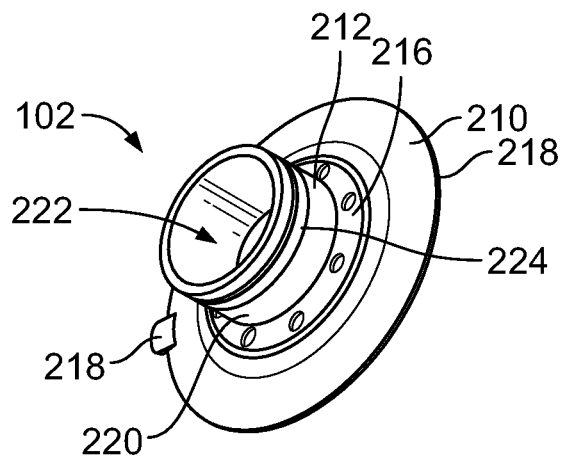
FIG. 16 illustrates a perspective top view of the suction cup.
Figure 17:
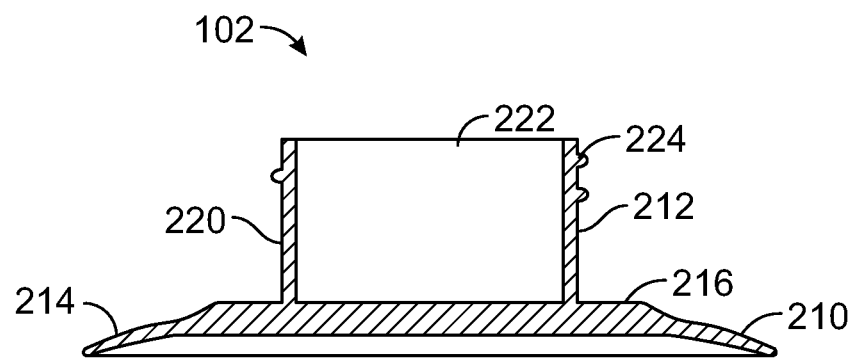
FIG. 17 illustrates a cross-sectional view of the suction cup through line 17-17 of FIG. 14.
Figure 18:
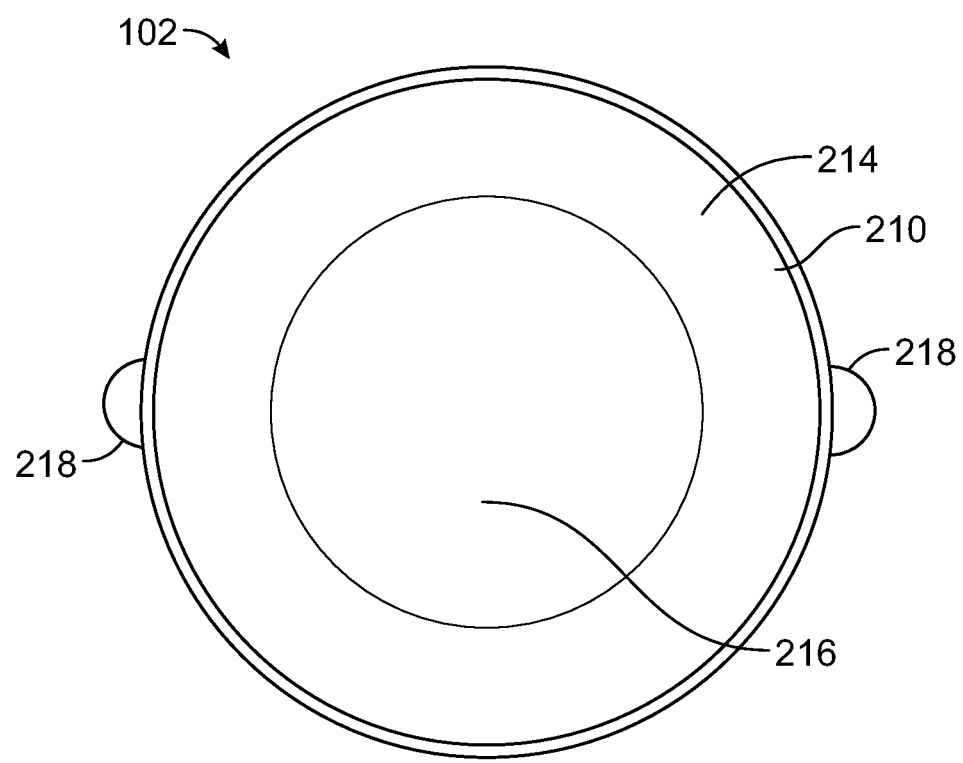
FIG. 18 illustrates a bottom view of the suction cup.

FIG. 14 illustrates a top view of the suction cup 102, according to an embodiment of the present disclosure. FIG. 15 illustrates a lateral view of the suction cup 102. FIG. 16 illustrates a perspective top view of the suction cup 102. FIG. 17 illustrates a cross-sectional view of the suction cup 102 through line 17-17 of FIG. 14. FIG. 18 illustrates a bottom view of the suction cup 102.

Referring to FIGS. 14-18, the suction cup 102 includes a suctioning base 210 integrally connected to a stem 212 extending upwardly from the suctioning base 210. The suctioning base 210 may include an outer annular lip 214 surrounding a flattened interior circular body 216. Pull tabs 218 may extend radially outward from outer edges of the annular lip 214. The pull tabs 218 are configured to be pulled outwardly from a surface to remove the suction cup 102 therefrom.

The stem 212 includes a cylindrical shaft 220 surrounding a central channel 222 that extends to the suctioning base 210. An outer surface of the shaft 220 may include threads 224 that are configured to threadably engage interior threads of the suction securing nut 106 (shown in FIG. 13).

Figure 19:
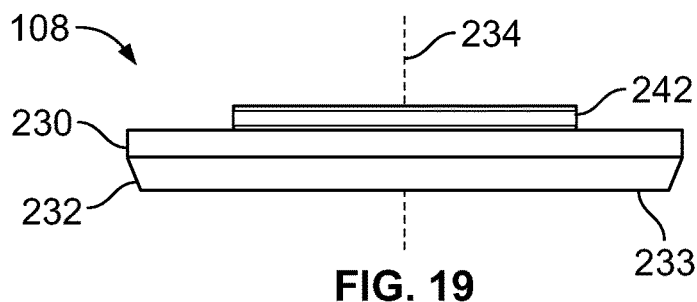
FIG. 19 illustrates a lateral view of a locking ring, according to an embodiment of the present disclosure.
Figure 20:
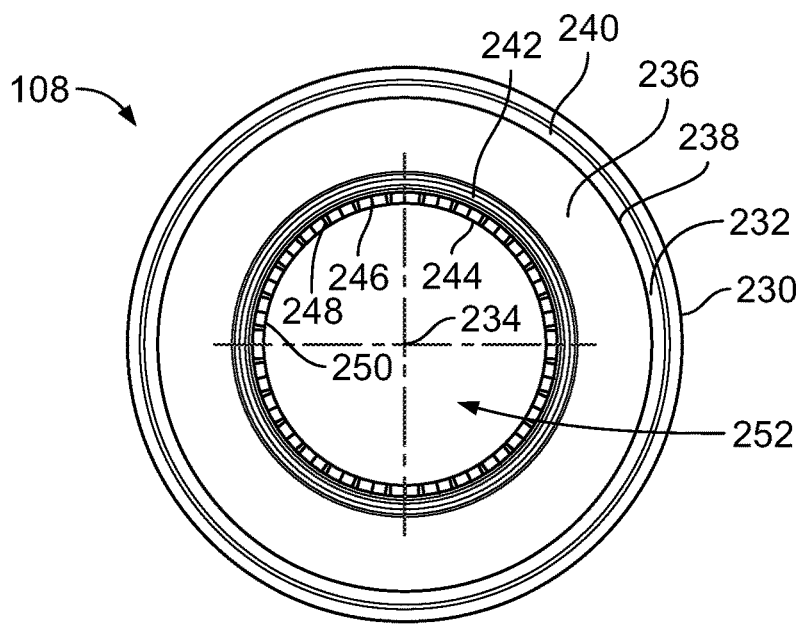
FIG. 20 illustrates a top view of the locking ring.
Figure 21:
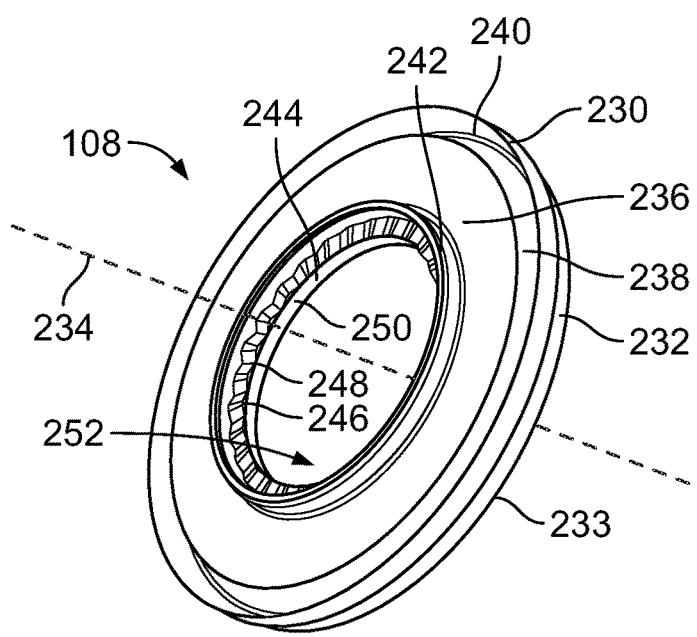
FIG. 21 illustrates a perspective top lateral view of the locking ring.

FIG. 19 illustrates a lateral view of the locking ring 108, according to an embodiment of the present disclosure. FIG. 20 illustrates a top view of the locking ring 108. FIG. 21 illustrates a perspective top lateral view of the locking ring 108. For the sake of clarity, the container retaining housing 110 (shown in FIGS. 1-9) is not shown in FIGS. 19-21.

Referring to FIGS. 19-21, the locking ring 108 includes an annular outer rim 230 and a beveled rim 232 extending downwardly from the outer rim 230. The beveled rim 232 inwardly cants from the outer rim 230 towards a central axis 234 of the locking ring 108. The inward cant angle of the beveled rim 232 may be greater or less than shown.

An inboard support base 236 connects to an inner diameter of the beveled rim 232 through an interior rim 238. The interior rim 238 may be coaxial with the outer rim 230. An interior groove 240 is formed between the outer rim 230, the beveled rim 232, and the interior rim 238.

An interior diameter of the inboard support base 236 connects to an interior upstanding annular wall 242, which upwardly extends from the support base 236. An interior ledge 244 inwardly extends from the annular wall 242 towards and about the central axis 234. The interior ledge 244 may be within one or more planes that are parallel to a plane of an upper surface of the support base 236. The interior ledge 244 may be serrated, and include a plurality of alternating peaks or teeth 246 and valleys or recesses 248 extending therearound. An interior edge 250 defines an internal circular passage 252. Alternatively, the interior ledge 244 may be smooth and flat, instead of serrated.

Referring to FIGS. 13-21, the locking ring 108 fits over the suction cup 102, such that the stem 212 passes through the passage 252 of the locking ring 108. A bottom edge 233 of the beveled rim 232 abuts into an upper surface of the annular lip 214 of the suctioning base 210.

Figure 22:
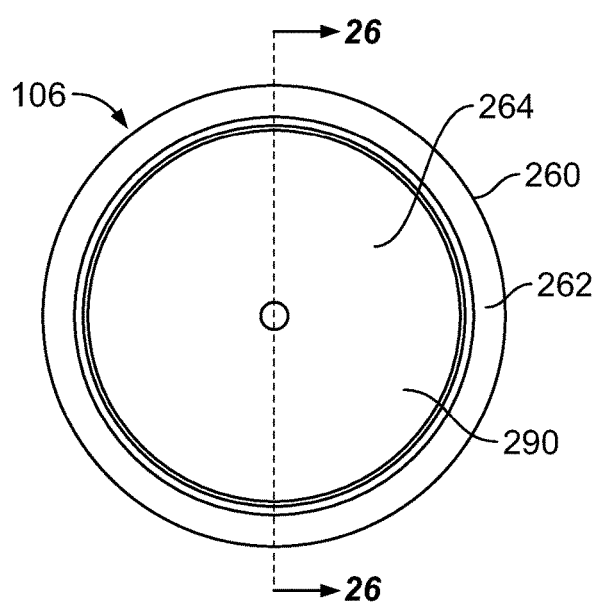
FIG. 22 illustrates a top view of a suction securing nut, according to an embodiment of the present disclosure.
Figure 24:
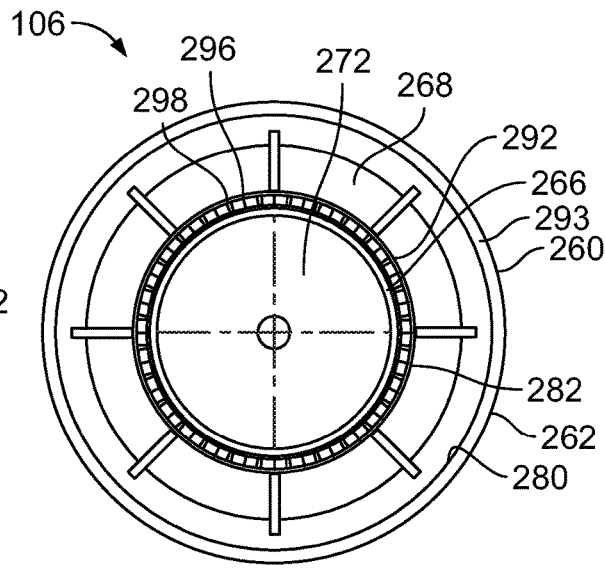
FIG. 24 illustrates a bottom view of the suction securing nut.
Figure 23:
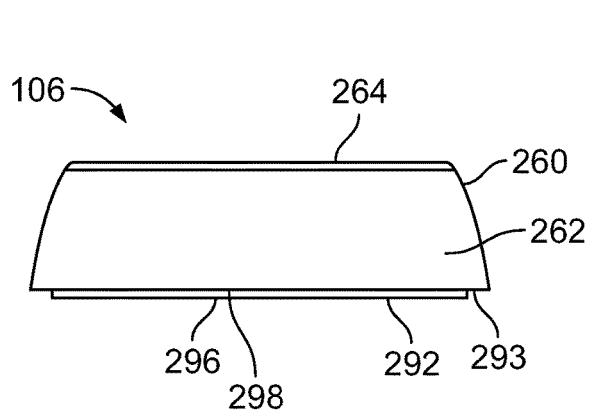
FIG. 23 illustrates a lateral view of the suction securing nut.
Figure 25:
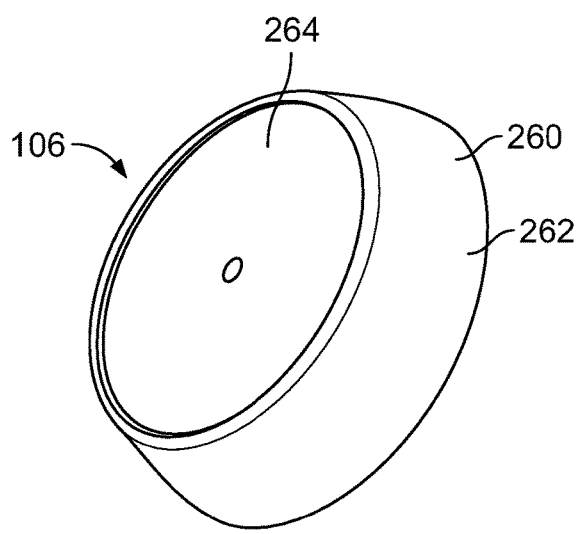
FIG. 25 illustrates a perspective top view of the suction securing nut.
Figure 26:
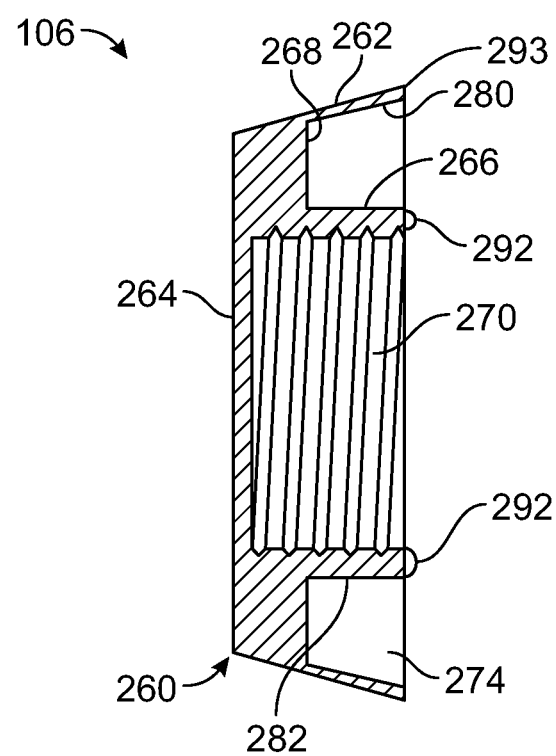
FIG. 26 illustrates a cross-sectional view of the suction securing nut through line 26-26 of FIG. 22.

FIG. 22 illustrates a top view of the suction securing nut 106, according to an embodiment of the present disclosure. FIG. 23 illustrates a lateral view of the suction securing nut 106. FIG. 24 illustrates a bottom view of the suction securing nut 106. FIG. 25 illustrates a perspective top view of the suction securing nut 106. FIG. 26 illustrates a cross-sectional view of the suction securing nut 106 through line 26-26 of FIG. 22.

Referring to FIGS. 22-26, the suction securing nut 106 is shown having a smooth outer perimeter. However, the suction securing nut 106 may have the tactile outer perimeter 150, as shown in FIGS. 10-12.

The suction securing nut 106 includes an outer shroud 260 having an outer circumferential wall 262 connected to an outer cap 264. An interior connecting tube 266 extends inwardly from an interior surface 268 of the cap 264. The connecting tube 266 includes an interior threaded surface 270 surrounding a central chamber 272. An outer channel 274 is defined between an interior surface 280 of the wall 262 and an outer surface 282 of the connecting tube 266. Alternatively, the stem 212 of the suction cup 102 may include an interior threaded surface that threadably receives and engages an outer threaded surface of the connecting tube 266 of the suction securing nut 106.

An outer surface 290 of the cap 264 may be configured to support one or more graphics, such as advertisements, information, or the like. For example, a graphics display may be formed on the outer surface 290 of the cap 264. In at least one embodiment, graphics displays may be directly formed, etched, written, adhesively secured, and/or the like onto the outer surface 290 of the cap 264. In at least one other embodiment, a clear pocket may be formed over the outer surface 290, and the graphics display may be formed on a sheet of plastic, paper, or the like that is inserted between the outer surface 290 and an interior surface of the clear pocket.

As shown, a lower edge 292 of the interior connecting tube 266 may extend below a lower surface 293 of the outer circumferential wall 262. The lower surface 293 may be serrated and include a plurality of alternating peaks or teeth 296 and valleys or recesses 298 extending therearound. The lower surface 293 of the interior connecting tube 266 is configured to couple to the interior ledge 244 of the locking ring 108 (shown in FIGS. 19-21), such that the peaks 296 and valleys 298 of the connecting tube 266 engage the peaks 246 and valleys 248 of the interior ledge 244 of the locking ring 108, thereby forcing the locking ring 108 into the suction cup 102. Alternatively, the lower surface 293 may be smooth and flat, instead of serrated.

Figure 27:
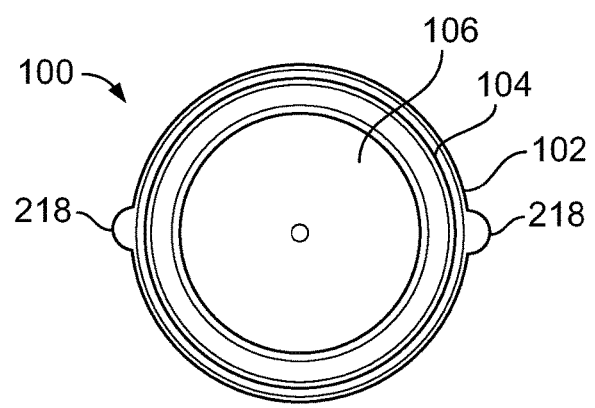
FIG. 27 illustrates a top view of the securing assembly.
Figure 29:
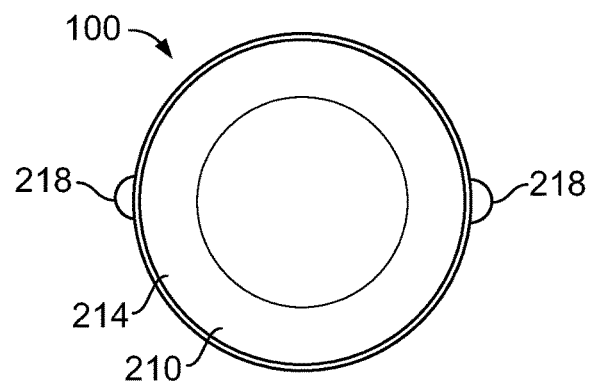
FIG. 29 illustrates a bottom view of the securing assembly.
Figure 28:
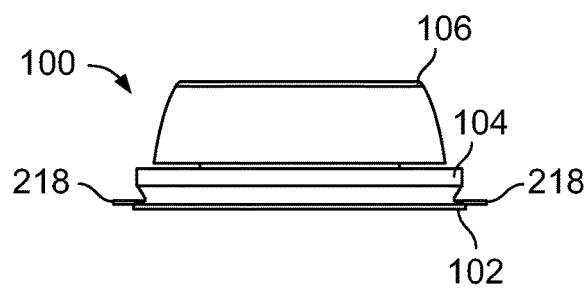
FIG. 28 illustrates a lateral view of the securing assembly.
Figure 30:
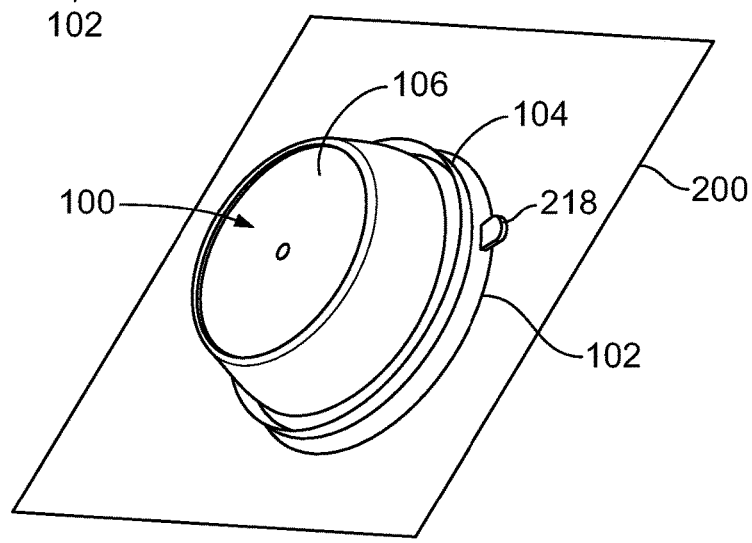
FIG. 30 illustrates a perspective view of the securing assembly secured to a structure, according to an embodiment of the present disclosure.

FIG. 27 illustrates a top view of the securing assembly 100. FIG. 28 illustrates a lateral view of the securing assembly 100. FIG. 29 illustrates a bottom view of the securing assembly 100. FIG. 30 illustrates a perspective view of the securing assembly 100 secured to the structure 200. For the sake of clarity, the container retaining housing 110 is not shown in FIGS. 27-30.

Referring to FIGS. 1-30, after the locking ring 108 has been coupled to the suction cup 102, as described above, the suction securing nut 106 is axially aligned over the stem 212 of the suction cup 102. The suction securing nut 106 is then urged onto the suction cup 102 such that the interior threaded surface 270 of the connecting tube 266 threadably engages the threads 224 of the stem 212. The suction securing nut 106 is then rotated in a securing direction A relative to the suction cup 102. As the suction securing nut 106 continues to be threaded in the securing direction A, the lower edge 292 of the interior connecting tube 266 is forced into the interior ledge 244 of the locking ring 108, thereby forcing the locking ring downwardly towards the suction cup 102 in the direction of arrow B. The engagement of the alternating peaks and valleys of the lower edge 292 and the interior ledge 244 may axially secure the suction securing nut 106 with respect to the locking ring 108 (such as via the peaks 296 of the lower edge 292 mating into reciprocal valleys 248 of the interior ledge 244, and the peaks 246 of the interior ledge 244 mating into reciprocal valleys 298 of the lower edge 292), so as to reduce slippage therebetween. As the suction securing nut 106 is tightened with respect to the stem 212, the bottom edge 233 of the beveled rim 232 of the locking ring 108 is forced into the annular lip 214 of the suctioning base 210, which causes the annular lip 214 to flatten. The flattening of the annular lip 214 provides a vacuum between the structure 200 and the suction cup 102. The locking ring 108 locks the suction cup 102 to the structure 200 via engagement with the suction securing nut 106. The suction securing nut 106 forces the locking ring 108 into the annular lip 214, flattening the annular lip 214 and forming a vacuum between the suction cup 102 and the structure 200, which forms a robust, strong, and reliable connection therebetween.

In order to remove the securing assembly 100 from the structure 200, the suction securing nut 106 is rotated in a direction that is opposite to the securing direction A (optionally, the securing direction A and the opposite direction may be reversed). As the suction securing nut 106 disengages from the stem 212 of the suction cup 102, the suction securing nut 106 disengages from the locking ring 108. As such, the force exerted by the locking ring 108 into the annular lip 214 decreases. The pull tabs 218 may then be pulled away from the structure 200, thereby removing the suction cup 102 therefrom.

As described herein, the suction cup 102, the locking member 104, and the suction securing nut 106 may form the securing assembly 100. As the connecting tube 266 is rotated into a securing position with the stem 212, the locking ring 108 is forced into the annular lip 214 of the suctioning base 210, which greatly increases the suctioning force exerted by the suctioning base 210 (such as by drawing air out of the interface between the structure 200 and the suctioning base 210 to create a vacuum), thereby increasing the securing force between the securing assembly 100 and the surface of the structure 200. It has been found that by including the locking ring 108 in the securing assembly 100, increased suction retaining force is achieved with the surface of the component, such as a glass surface of a refrigerated compartment door, a mirror, a window, and/or the like. The resulting suctioning force achieved by operation of the locking ring 108 with the suction securing nut 106 and the suction cup 102 greatly exceeds that of a standard suction cup that is merely linearly pressed into a surface of a component.

Figure 31:
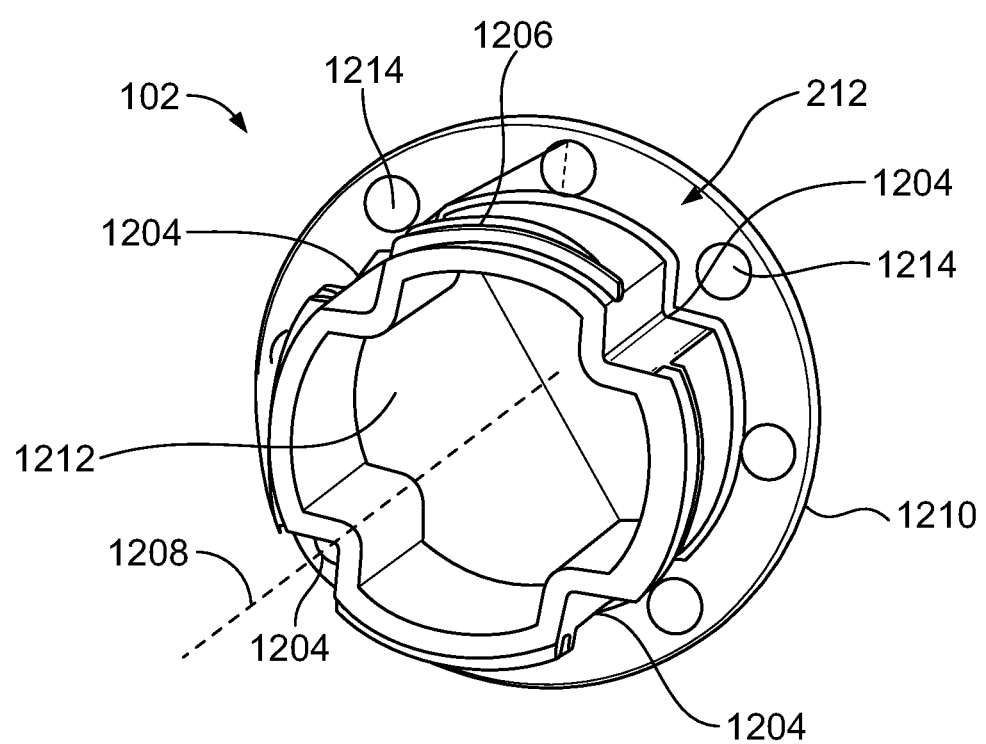
FIG. 31 illustrates a perspective top view of a stem of a suction cup, according to an embodiment of the present disclosure.

FIG. 31 illustrates a perspective top view of a stem 212 of a suction cup 102, according to an embodiment of the present disclosure. Keying members 1204 may be formed through the stem 212. Outer surfaces of the stem 212 may include threads 1206, as described above. The keying members 1204 may be channels, indentations, divots, recessed areas, notches, slots, or the like, formed in an outer surface of the stem 212. Each keying member 1204 may be formed along a height of the stem 212 and may be parallel to a central axis 1208 of the stem 212. As shown, four evenly-spaced keying members 1204 are shown. Alternatively, more or less keying members than shown may be used.

The keying members 1204 provide alignment keys that are configured to receive reciprocal structures formed on a component, such as an accessory, bracket or the like, in order to maintain the component in a desired position. For example, securing mounts may include inwardly directed tabs extending into the passages. The tabs may be retained within the keying members 1204 to securely maintain a product holder system, for example, at a desired orientation. Any of the embodiments described herein may include the keying members 1204. Optionally, embodiments may not include the keying members 1204.

Additionally, a flange 1210 radially extends from a base 1212 of the stem 212. The flange 1210 may include one or more holes 1214 formed therethrough. More or less holes than shown may be used. A suctioning base (such as the suctioning base 210) may be secured over or otherwise onto the flange 1210. The holes 1214 are configured to allow the flexible material of the suctioning base to flow around and through the flange 1210, thereby providing an increased retaining interface, as well as providing a greater degree of flexibility to the suctioning base. Any of the embodiments described herein may include the holes 1214. Optionally, embodiments may not include the holes 1214.

Figure 32:
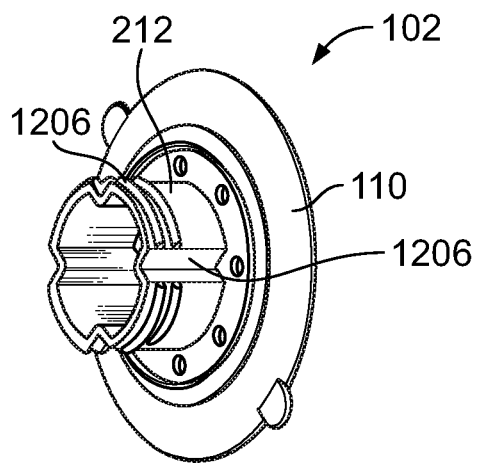
FIG. 32 illustrates a perspective view of a suction cup, according to an embodiment of the present disclosure.
Figure 33:
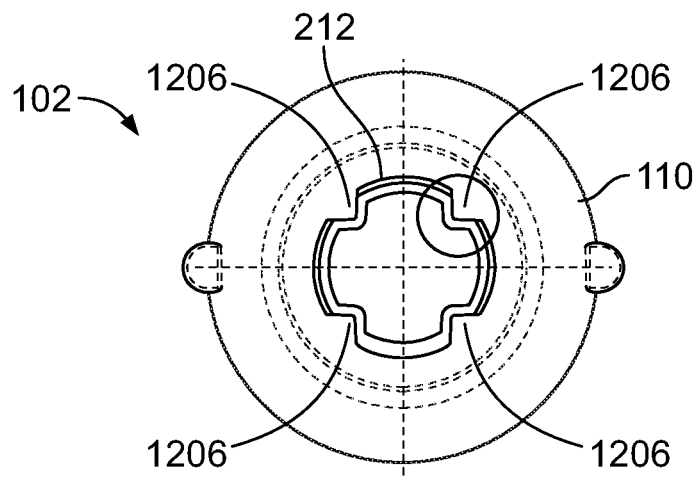
FIG. 33 illustrates a top view of a suction cup, according to an embodiment of the present disclosure.
Figure 34:
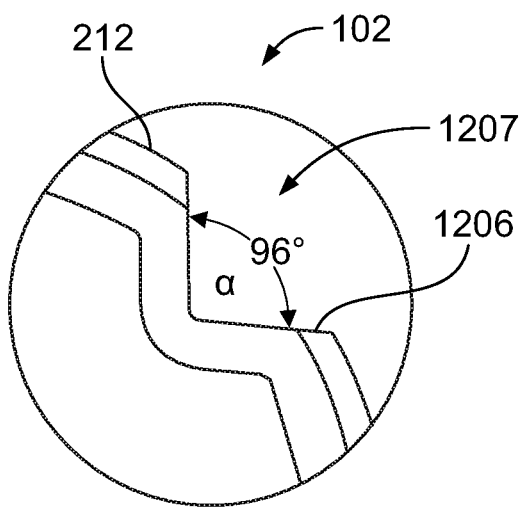
FIG. 34 illustrates a top view of a keying member of a suction cup, according to an embodiment of the present disclosure.

FIG. 32 illustrates a perspective view of the suction cup 102, according to an embodiment of the present disclosure. FIG. 33 illustrates a top view of the suction cup 102. Referring to FIGS. 32 and 34, as shown, the suctioning base 210 is secured to the stem 212. The threads 1206 are formed on an outer surface of the stem 212, while the keying members 1204 are formed through portions of the stem 212.

FIG. 34 illustrates a top view of a keying member 1206 of the suction cup 102, according to an embodiment of the present disclosure. As shown, the keying member 1206 may be an indented feature within the outer wall of the stem 212. The indentation 1207 may form an angle α that may conform to an outer surface of a mounting bracket of a component. For example, the angle α may be 96°. Alternatively, the angle α may be greater or less than 96°.

Figure 35:
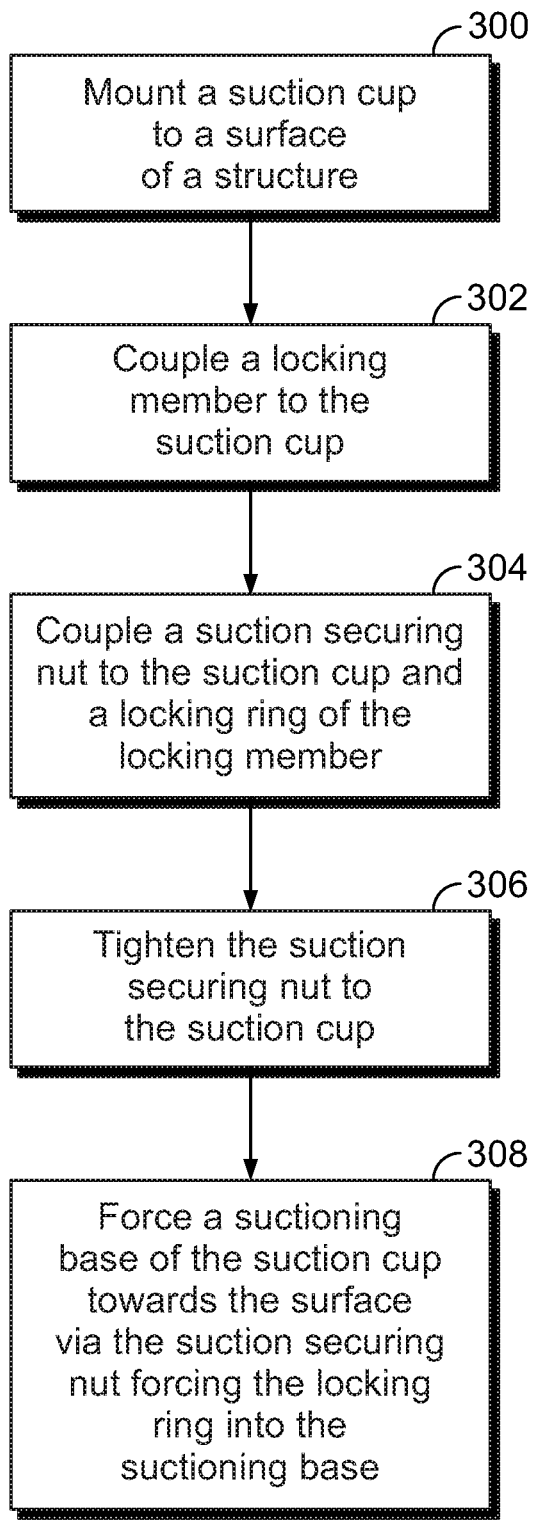
FIG. 35 illustrates a method of coupling a securing assembly to a surface of a structure, according to an embodiment of the present disclosure.

FIG. 35 illustrates a method of coupling a securing assembly to a surface of a structure, according to an embodiment of the present disclosure. Referring to FIGS. 1-35, at 300, the suction cup 102 is mounted to a surface of the structure 200. At 302, the locking ring 108 of the locking member 104 is coupled to the suction cup 102. At 304, the suction securing nut 106 is coupled to the suction cup 102 and the locking ring 108. At 306, the suction securing nut 106 is tightened in relation to the suction cup 102. At 308, the suctioning base 210 of the suction cup 102 is forced towards the surface of the structure 200 via the suction securing nut 106 forcing the locking ring 108 into the suctioning base 210.

In at least one embodiment, an intermediate structure, such as portion of a bracket, hanger, rope, string, and/or the like, may be disposed between the suction cup 102 and the locking ring 108, and/or the between the locking ring 108 and the suction securing nut 106. For example, a portion of a bracket may be hung around a portion of the suction cup 102 (such as the stem 212), a portion of the locking ring 108 (such as the rim 230), and/or a portion of the suction securing nut 106 (such as the wall 262).

In at least one embodiment, the securing assembly may secure to another component. For example, the securing assembly may be configured to secure to a bracket (such as a metal or plastic bracket) having a hole that is larger than a stem, for example, of the securing assembly. In this manner, the securing assembly may be retained by the bracket or a portion thereto. Further, the container retaining housing 110 of the locking member 104 is configured to retain a container.

Referring to FIGS. 1-35, certain embodiments of the present disclosure provide a method of forming a locking member that configured to couple to a suction cup and a suction securing nut. The method includes coupling (for example, directly connecting, and/or integrally forming with) a container retaining housing to a locking ring. The container retaining housing is configured to retain a container. In at least one example, the method includes integrally forming the locking ring and the container retaining housing together to provide a single, unitary, monolithic structure.

As described herein, embodiments of the present disclosure provide robust securing assemblies that are configured to retain containers. Further, embodiments of the present disclosure provide securing assemblies that are configured to retain containers, and provide a reliable and strong coupling to surfaces of structures.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A locking member configured to couple to a suction cup and a suction securing nut, the locking member comprising:
   a locking ring; and
   a container retaining housing coupled to the locking ring, wherein the container retaining housing is configured to retain a container, wherein the container retaining housing comprises:
   a support base;
   a front wall connected to the support base, wherein the front wall comprises an outer perimeter frame defining a center opening, wherein the outer perimeter frame comprises: upright lateral beams; upwardly angled upper beams connected to the upright lateral beams; a neck joint connecting the upwardly angled upper beams; and a neck coupler connected to the neck joint, wherein the neck coupler is configured to securely couple to a neck of the container; and
   lateral support walls, wherein at least portions of the lateral support walls are connected to the support base and the front wall.

2. The locking member of claim 1, wherein the locking ring and the container retaining housing are integrally formed together to provide a single, unitary, monolithic structure.

3. The locking member of claim 1, wherein the container retaining housing upwardly extends from the locking ring.

4. The locking member of claim 1, further comprising a panel upwardly extending from the locking ring to the container retaining housing.

5. The locking member of claim 4, wherein the lateral support walls upwardly extend from the locking ring on sides of the panel.

6. The locking member of claim 1, wherein the lateral support walls comprise:
   lower arcuate edges having upwardly bowed contours; and
   upper arcuate edges having downwardly bowed contours.

7. The locking member of claim 1, wherein the support base is orthogonal to one or both of the front wall and the at least portion of the lateral support walls.

8. The locking member of claim 1, wherein the container retaining housing extends forwardly in relation to the locking ring.

9. A securing assembly configured to removably secure to a surface of a structure, the securing assembly comprising:
   a suction cup;
   a suction securing nut coupled to the suction cup; and a locking member coupled to the suction cup and the suction cup, the locking member comprising:
 a locking ring; and
 a container retaining housing coupled to the locking ring, wherein the container retaining housing is configured to retain a container, wherein the container retaining housing comprises:
  a support base;
  a front wall connected to the support base, wherein the front wall comprises an outer perimeter frame defining a center opening, wherein the outer perimeter frame comprises: upright lateral beams; upwardly angled upper beams connected to the upright lateral beams; a neck joint connecting the upwardly angled upper beams; and a neck coupler connected to the neck joint, wherein the neck coupler is configured to securely couple to a neck of the container; and
  lateral support walls, wherein at least portions of lateral support walls are connected to the support base and the front wall.

10. The securing assembly of claim 9, wherein the locking ring and the container retaining housing are integrally formed together to provide a single, unitary, monolithic structure.

11. The securing assembly of claim 9, wherein the container retaining housing upwardly extends from the locking ring.

12. The securing assembly of claim 9, further comprising a panel upwardly extending from the locking ring to the container retaining housing wherein the lateral support walls upwardly extend from the locking ring on sides of the panel.

13. The securing assembly of claim 9, wherein the lateral support walls comprise:
 lower arcuate edges having upwardly bowed contours; and
 upper arcuate edges having downwardly bowed contours.

14. The securing assembly of claim 9, wherein the suction securing nut comprises a tactile outer perimeter including a regularly alternating series of protuberances and indentations.

15. A locking member comprising:
 a locking ring; and
 a container retaining housing coupled to the locking ring, wherein the container retaining housing comprises:
  a support base; and
  a front wall connected to the support base, wherein the front wall comprises upright lateral beams; upwardly angled upper beams connected to the upright lateral beams; a neck joint connecting the upwardly angled upper beams; and a neck coupler connected to the neck joint, wherein the neck coupler is configured to securely couple to a neck of the container.

16. The locking member of claim 15, wherein the container retaining housing further comprises lateral support walls, wherein at least portions of the lateral support walls are connected to the support base and the front wall.

17. The locking member of claim 15, wherein the locking ring and the container retaining housing are integrally formed together to provide a single, unitary, monolithic structure.

18. The locking member of claim 15, further comprising a panel upwardly extending from the locking ring to the container retaining housing.

19. The locking member of claim 15, wherein the support base is orthogonal to the front wall.

20. The locking member of claim 15, wherein the container retaining housing extends forwardly in relation to the locking ring.

* * * * *